March 7, 1961 A. N. GARTHWAITE 2,974,258

ELECTRONIC PACKAGING

Filed Dec. 19, 1956 2 Sheets-Sheet 1

INVENTOR
ALBERT N. GARTHWAITE
BY John E. Daugherty Jr.
AGENT

March 7, 1961 A. N. GARTHWAITE 2,974,258

ELECTRONIC PACKAGING

Filed Dec. 19, 1956 2 Sheets-Sheet 2

United States Patent Office 2,974,258
Patented Mar. 7, 1961

2,974,258

ELECTRONIC PACKAGING

Albert N. Garthwaite, Poughkeepsie, N.Y., assignor to International Business Machines Corporation, New York, N.Y., a corporation of New York Filed Dec. 19, 1956, Ser. No. 629,349

2 Claims. (Cl. 317—101)

The present invention is related to circuit packaging and more particularly to an improved modular package for functional circuits and to a method of assembling functional circuits in modular form.

Two goals, which are constantly striven for, in the design of circuit packaging for present day complex electronic equipment, are standardization and miniaturization. One approach to the former is what has come to be known as the building block technique of fabricating circuit components. In accordance with this philosophy, basic functional circuits, such as trigger circuits, inverter circuits and emitter follower circuits, are packaged as units. The packaged units, or modules, as they have come to be known, may then be employed in a variety of more complex circuits which utilize any number of the basic modular circuits. Standardization is achieved in manufacture in that the basic modules may be assembled on a mass scale and thereafter interconnected with other circuit modules to form any desired circuit arrangement. In this modular or building block approach the second goal mentioned above is also kept sight of, every effort being made to package each of the particular modular circuits in as compact an arrangement as possible.

A primary object of the present invention is to provide an improved method of inexpensively fabricating basic functional circuits in modular form.

This object and other objects hereafter set forth are achieved, as is shown in the embodiment of the invention herein disclosed, by providing in a closed arrangement a plurality of slotted terminal posts which, in number, are equal to the number of junction points in the circuit to be packaged. The various circuit elements which comprise the circuit are then placed within the closed arrangement of posts with the leads of each in the slots of the particular posts which represent the junctions to which they are electrically connected in the circuit. The circuit elements may be assembled in layers with insulating wafers separating their leads or, if desired, the necessity for insulating wafers may be eliminated by employing elements having leads, all but the extreme end portions of which are covered with an insulating coating. The assembly is then rolled in a solder bath to permanently connect the leads to the terminal posts. A sleeve may then be placed around the posts and the assembly potted or, if desired the assembly may be encapsulated in a glass or metal envelope. The junction posts are designed to extend below the assembly and serve as pin connectors which may be employed to connect the module in a socket or printed circuit panel.

A further object of the invention is to provide an improved modular circuit package.

Another object is to provide a means of packaging modular circuits which include a number of circuit elements wherein the circuit elements are supported within a closed arrangement of terminal posts and all circuit connections are accomplished employing only the circuit element leads and the terminal posts and in which there is no need to employ other wire or printed circuit interconnections.

Another object is to provide an improved circuit package and a method of fabricating the package wherein the circuit elements included in the circuit to be packaged are supported within a circular arrangement of slotted terminal posts which, in number, are equal to the number of electrical junctions in the circuit being packaged.

Other objects of the invention will be pointed out in the following description and claims and illustrated in the accompanying drawings, which disclose, by way of example, the principle of the invention and the best mode, which has been contemplated, of applying that principle.

Figure 1:
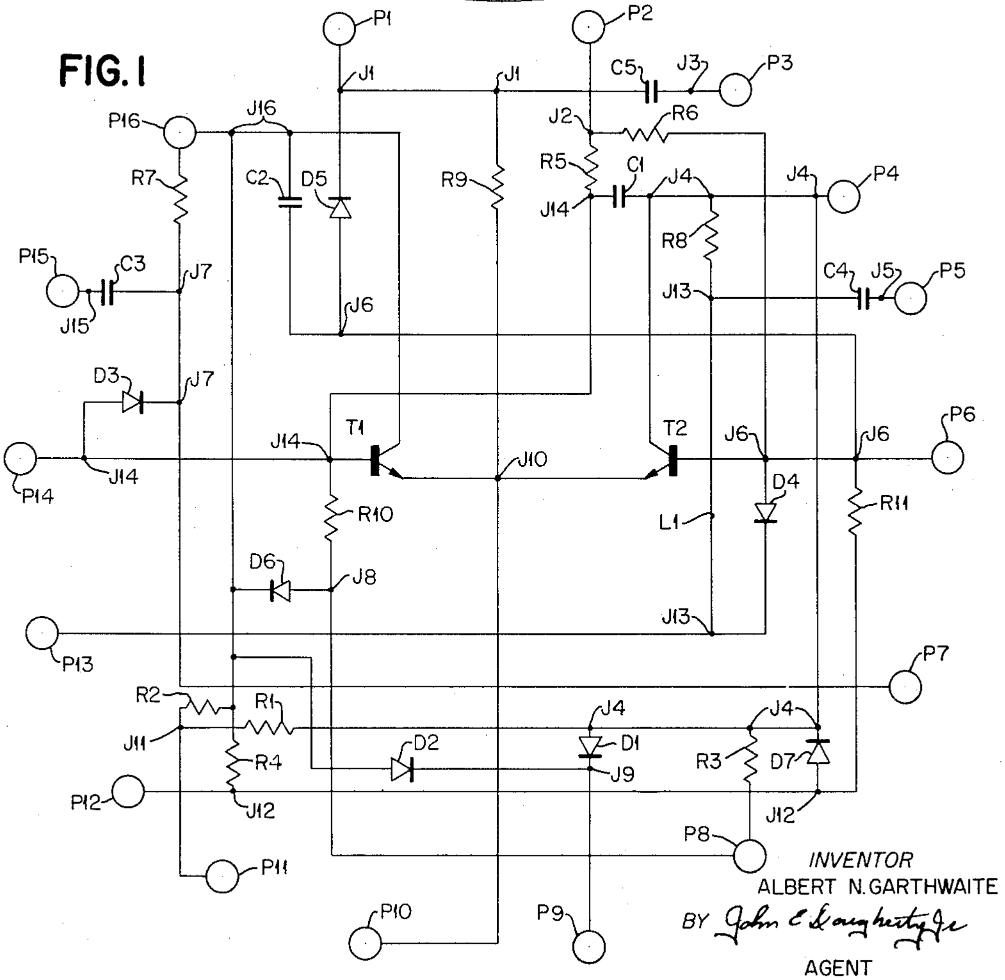
Fig. 1 is a schematic representation of a trigger circuit.

There is shown in Fig. 1 a circuit comprising a pair of transistors T1 and T2 connected with resistors R1 through R11, capacitors C1 through C5, and diodes D1 through D7, to form a trigger circuit. The circuit is similar to that shown in the copending application Serial No. 628,818 filed December 17, 1956; in behalf of C. Handen, and now U.S. Patent 2,898,522 which application is directed to a printed circuit type of package for circuits of this nature. Since trigger circuits are well known in the art and the circuit per se forms no part of the present invention, the operation of the circuit itself is not here described. The first step in packaging this circuit, in accordance with the principles of the present invention, is to ascertain the number of electrical junction points in the circuit, that is the number of points at which two or more wires from different components are connected and the number of points at which inputs of any nature are to be applied to the circuit or outputs developed at other than a connecting point between two components. These junctions are designated J1 through J16 in Fig. 1 and note should be made of the fact that where two such connecting points are shown as directly connected by a connecting wire and are therefore electrically common, they are given the same designation. For example there are two connecting points designated J13 which are interconnected by wire L1 and these connecting points are electrically the same junction point in the circuit. A plurality of terminals, designated P1 through P16, are shown connected to corresponding junctions J1 through J16. Certain of these terminals are connected to junctions at which potentials or inputs are directly applied to the circuit. For example terminal J10 is, when the circuit is in operation, connected to ground potential. Others of the terminals shown, such as that at P12, are connected to junctions which, when the circuit is in operation, are not connected to any outside circuitry. Terminals connected to junctions in the latter group are shown in Fig. 1 to more clearly illustrate the principles of the invention.

Figure 2:
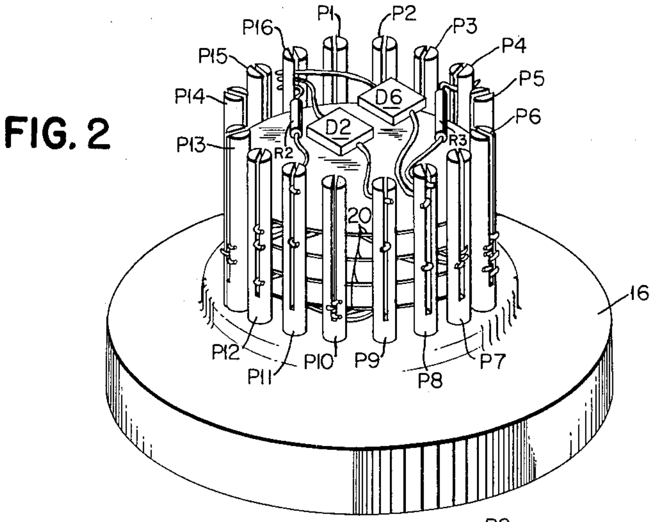
Fig. 2 shows the circuit of Fig. 1 assembled in accordance with the principles of the invention.
Figures 3, 4, 4A, 4B, 4C, 4D, 4E:
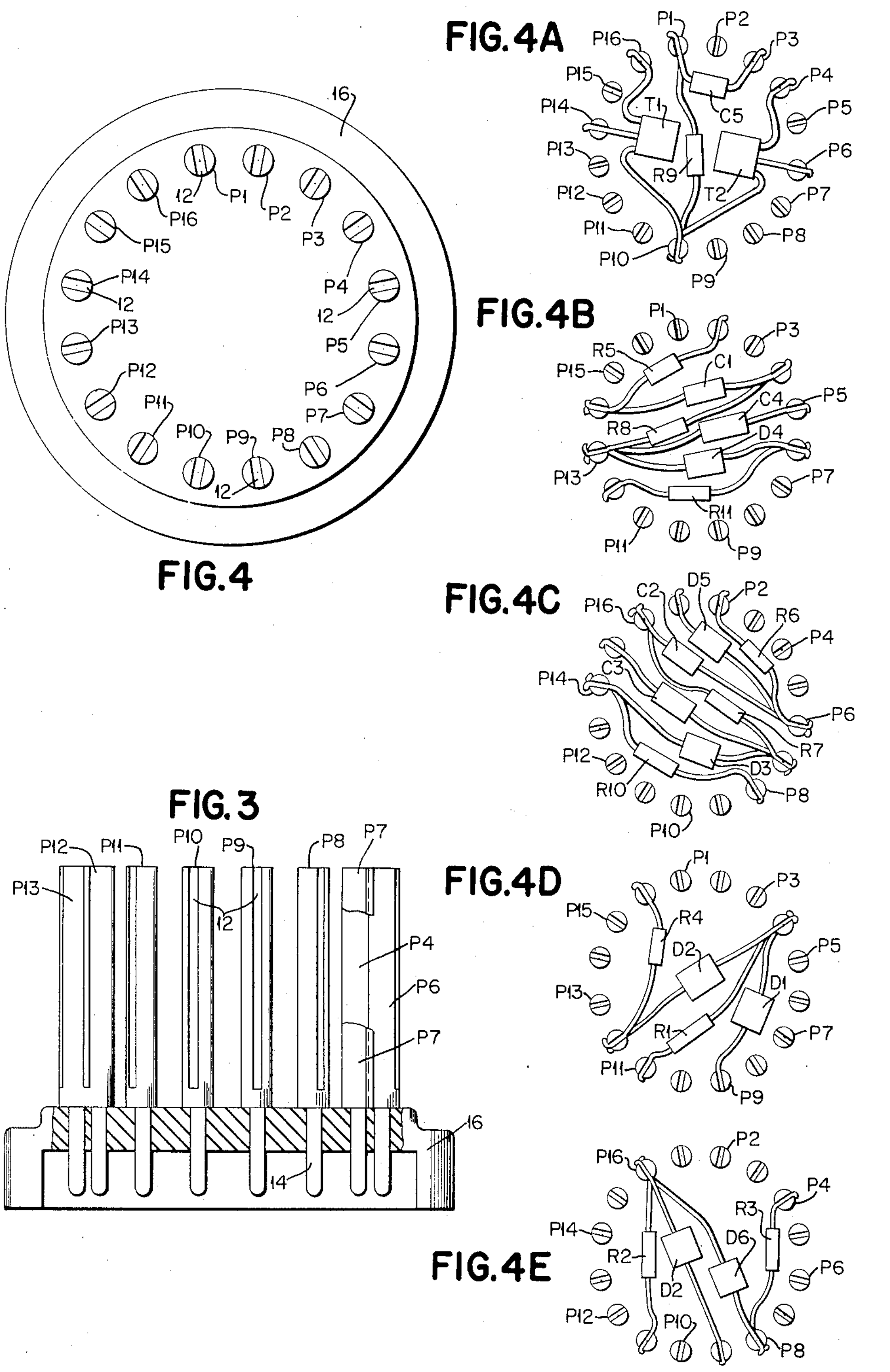
Fig. 3 is a section view showing the manner in which the junctoin posts may be mounted on a temporary base.
Fig. 4 is a plan view showing the circular arrangement of junction posts before the circuit elements are inserted.
Figs. 4A, 4B, 4C, 4D and 4E are plan views showing successive steps in the assembly of the circuit of Fig. 1.

When the number of terminals has been thus ascertained, there being sixteen terminals in the circuit under consideration, the next step is to arrange a like number of slotted posts in a closed configuration. Posts, designated P1 through P16 to correspond to the terminals which they represent in the circuit drawing of Fig. 1, are shown in Fig. 2 arranged in a circular configuration with certain of the circuit elements already inserted. Cross sectional and plan views of the post arrangement before the circuit elements are inserted are shown in Figs. 3 and 4, respectively. The upper portion of each of the posts in provided with a longitudinal slot 12 which extends the greater part of the length of the post, and the lower portion of each post is in the form of a pin 14 similar to those used in mounting vacuum tubes. The sixteen pins 14 are mounted in holes which are provided in a base 16. The base may be made of a material known as Teflon which is a polytetrafluoroethylene which is chemically inert, can withstand the temperature at which soldering is done later in the process, and resists potting material such as may be employed to encapsulate the package after the circuit elements are inserted and soldered.

Figs. 4A, 4B, 4C, 4D and 4E show the manner in which the circuit elements are inserted in successive layers within the circular configuration of posts mounted on the Teflon base 16. The bottom layer, as shown in Fig. 4A, includes the two transistors T1 and T2, the resistor R9, and the capacitor C5. The elements shown in Fig. 4A are inserted with their leads in the slots of the particular posts that represent the junction points between which they are electrically connected to the circuit. For example, one lead of resistor R9 is inserted in the slot 12 of post P1 and the other lead of this resistive element is inserted in the slot 12 of post 3, which arrangement, as can be seen from an examination of Fig. 2, conforms to the electrical requirements of the circuit. For facility of insertion, manual or automatic, the leads of the electrical elements may be preformed to the configuration required to fit within the circular arrangement of posts in the manner shown in Fig. 4A. After the four elements of this bottom layer are inserted an insulating disc 20 is inserted within the circular configuration of posts. The second layer of elements, consisting of resistors R5, R8 and R11, capacitor C1, and diode D4 are then inserted with their leads in the slots in the proper posts. Another insulating disc, the third layer of electrical elements (Fig. 4C), a third insulating disc, the fourth layer of electrical elements (Fig. 4D), a fourth insulating disc, and the fifth layer of electrical elements (Fig. 4E) are then inserted within the circular arrangement of posts, the leads of each electrical element being inserted in the slots 12 of the posts representing the electrical junction points to which they are connected in the circuit.

After all of the electrical elements are thus assembled, the entire unit is turned on its side and rotated in a solder pot. The element leads are, as shown in Fig. 2, crimped at their ends to facilitate the soldering operations. The discs 20 are formed to fit snugly against the posts and these discs and the crimped leads serve to hold the elements steady during the dip soldering operation.

After the leads of the elements have been thus permanently connected to the posts a cylindrical sleeve may be placed around the circular configuration of posts. A potting material which may, for example, be of the epoxy resin type, may then be poured into the container formed by the sleeve and the base member 16 and allowed to set. The sleeve may be a temporary one to which the potting material does not adhere and can therefore be removed after the potting material sets or the sleeve may be chosen to be of a material which adheres to the potting material and becomes a part of the packaged circuit. The utilization of the potting material serves to protect the circuit package against shock, and temperature and humidity effects, to extend the shelf life of the circuit, and to provide ease of handling of the assembly.

It should be noted that the utilization of the Teflon material is advantageous in that this material is inert chemically, can withstand the temperature of the solder bath and resists the potting material so that it may be easily separated from the circuit package after the potting operation.

Further note should be made of the fact that instead of using the Teflon base and potting the package, a permanent glass base through which the pin extensions of the terminal posts extend might be utilized and the package, after insertion of the elements, might be encapsulated in a glass or metal envelope. If desired the necessity of utilizing the insulating discs may be obviated if all but the outer extensions of the leads of the electrical elements are covered with an insulating coating.

It is of course obvious that the configuration of the lower ends of the posts might be in any desired configuration in accordance with the type of socket into which the package is to be plugged. Further, though no automatic inserting machinery is herewith disclosed, not being part of the present invention, it is apparent to those skilled in the art that the method of achieving circuit packaging herein disclosed is readily adapted to automatic assembly procedures.

Where automatic techniques of assembly are employed, it might be deemed advisable to achieve the permanent connections between terminal posts and element leads by a cold welding process rather than by a soldering process. Comment should also be made of the fact that the package of the present invention offers advantages from a capacitance viewpoint in that by mounting the circuit elements in layers, as shown, the lead length is short and the distributed capacitance of the unit is relatively small. Further, since the spacial relationship of components and leads, once determined, is the same for all units made, the problem of stray capacitance is greatly alleviated. It might also be noted that due to the fact that the lead length of the transistors may be longer in the subject package than is usual where the leads are inserted in a printed circuit panel or socket, the possibility of heat transfer damaging the transistors during soldering is also diminished.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A modular package for an electrical circuit which includes a plurality of circuit elements having connecting leads attached thereto and a number of electrical junction points, there being one electrical junction point for each point at which one or more of said connecting leads of said elements are electrically connected together and one electrical junction point for each point at which an input for said circuit is to be applied or an output developed at other than one of the junction points between the leads of said elements, said modular package comprising; a plurality of electrically conductive terminal posts and an insulating base member; said plurality of posts being equal in number to said number of junction points; each of said posts including a first portion having a longitudinal slot therein and a second portion formed as a contact pin; all of said posts extending through said base member with said first portions extending above said member and said second portions extending below said member and arranged in a circular configuration in essentially parallel relationship; the diameter of said configuration being less than the length of any of said elements and connecting leads; said circuit elements being divided into groups with each group arranged in a plane substantially normal to said posts, the leads on said elements in said groups extending into the slots in the posts representing the junctions to which they are required to be connected in said circuit and connected to and supported by these posts; and each of said posts connected to others of said posts only through one or more of said elements.

2. A modular electrical circuit package comprising; a plurality of circuit elements having connecting leads attached thereto, a plurality of electrically conductive terminal posts, and an insulating base member only; said plurality of terminal posts being equal in number to the number of electrical junctions in said circuit; said terminal posts having a longitudinal slot extending the greater portion of the length thereof and a lower portion formed as a contact pin, said posts being arranged in a closed configuration substantially parallel one to another and substantially normal to said base member with said lower portions extending below said base member and said greater portions extending above said base member; the distance from any one of said posts to any other of said posts being less than the length of any of said circuit elements and connecting leads; said plurality of circuit elements being arranged in a plurality of planes substantially normal to said posts with the leads of each of said elements connected into the slot of the post representing the unique junction to which they are connected in said circuit; and each of said leads being soldered to said posts whereby said posts are effective to both directly support and complete all the necessary connections between said circuit elements.

References Cited in the file of this patent

UNITED STATES PATENTS

| | | |
|---|---|---|
| Re. 23,921 | Scoville | Jan. 11, 1955 |
| 2,533,483 | Losquadro | Dec. 12, 1950 |
| 2,754,454 | McNutt | July 10, 1956 |
| 2,764,713 | Alden | Sept. 25, 1956 |
| 2,816,252 | Sanders | Dec. 10, 1957 |
| 2,885,602 | Emerson | May 5, 1959 |
| 2,885,603 | Rose | May 5, 1959 |
| 2,918,640 | Higgs | Dec. 22, 1959 |

FOREIGN PATENTS

| | | |
|---|---|---|
| 637,596 | Great Britain | May 24, 1950 |
| 664,024 | Great Britain | Jan. 2, 1952 |
| 755,974 | Great Britain | Aug. 29, 1956 |